United States Patent
Zarudyanskiy et al.

(10) Patent No.: US 8,214,854 B2
(45) Date of Patent: Jul. 3, 2012

(54) METHOD AND SYSTEM FOR FACILITATING ANALYSIS OF AUDIENCE RATINGS DATA FOR CONTENT

(75) Inventors: Dmitriy Zarudyanskiy, Staten Island, NY (US); Grafton Mouen, NY, NY (US)

(73) Assignee: Disney Enterprises, Inc., Burbank, CA (US)

( * ) Notice: Subject to any disclaimer, the term of this patent is extended or adjusted under 35 U.S.C. 154(b) by 404 days.

(21) Appl. No.: 11/706,089

(22) Filed: Feb. 13, 2007

(65) Prior Publication Data

US 2008/0196054 A1    Aug. 14, 2008

(51) Int. Cl.
*H04H 60/33* (2008.01)
(52) U.S. Cl. .................. 725/9; 725/10; 725/11; 725/13; 725/14; 725/19; 725/20; 725/21
(58) Field of Classification Search .................. 725/36, 725/9–11, 13–14, 19–21; 348/461–462, 348/468
See application file for complete search history.

(56) References Cited

U.S. PATENT DOCUMENTS

| | | | |
|---|---|---|---|
| 6,061,056 A * | 5/2000 | Menard et al. | 715/704 |
| 7,047,550 B1 * | 5/2006 | Yasukawa et al. | 725/44 |
| 7,421,729 B2 * | 9/2008 | Zenoni | 725/146 |
| 2002/0056087 A1 * | 5/2002 | Berezowski et al. | 725/9 |
| 2003/0093790 A1 * | 5/2003 | Logan et al. | 725/38 |
| 2003/0172374 A1 * | 9/2003 | Vinson et al. | 725/9 |
| 2003/0177503 A1 * | 9/2003 | Sull et al. | 725/112 |
| 2006/0287915 A1 * | 12/2006 | Boulet et al. | 705/14 |
| 2006/0293955 A1 * | 12/2006 | Wilson et al. | 705/14 |

* cited by examiner

*Primary Examiner* — Pankaj Kumar
*Assistant Examiner* — Alazar Tilahun
(74) *Attorney, Agent, or Firm* — Farjami & Farjami LLP

(57) ABSTRACT

There is provided a method for use by a content processing device for facilitating the analysis of audience ratings data for content. In one embodiment, content is received from a source. Then, the content is encoded into a target format to enable insertion of a first number of markers in the content, each of the first number of markers indexing a time period of the content. Thereafter, a content records database that includes the audience ratings data corresponding to the content are accessed. The audience ratings data are then associated with the first number of markers. The audience ratings data are displayed during playback of the content.

24 Claims, 3 Drawing Sheets

METHOD AND SYSTEM FOR FACILITATING ANALYSIS OF AUDIENCE RATINGS DATA FOR CONTENT

BACKGROUND OF THE INVENTION

1. Field of the Invention

The present invention relates generally to content processing. More particularly, the present invention relates to methods and systems for processing content to facilitate the analysis of content.

2. Background Art

Audience ratings data for content, such as Nielsen Ratings, are critical tools for measuring audience size and for determining the composition of content programming on television. Moreover, advertisers heavily rely on such content ratings when deciding to purchase advertising time from television networks.

Modernly, such audience ratings data for content can be collected using electronic devices, which can be connected to every television in a selected home. The devices can gather the viewing habits of the home and transmit the information through a phone line to a database. The devices can provide audience ratings data on a minute-by-minute basis, providing the exact moment viewers change channels. Such minute-by-minute audience ratings data can be used, for example, by audience researchers, audience response researchers, and production executives to analyze changes in audience ratings for the content during particular periods of the content.

However, the analysis of content using minute-by-minute audience ratings data can be very tedious and difficult. For example, each time the audience ratings data indicates a sudden drop in the size of the viewing audience, the content must be advanced to the time period of the content corresponding to the sudden drop in audience ratings data to discover the reasons for the sudden drop. Considering that networks can have vast amounts of content requiring such analysis, the analysis of content using minute-by-minute audience ratings data can be extremely time consuming and costly.

Thus, there exists a strong need in the art for methods and systems that increase the efficiency of the analysis of audience ratings for content.

SUMMARY OF THE INVENTION

There is provided methods and systems for facilitating the analysis of audience ratings data for content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
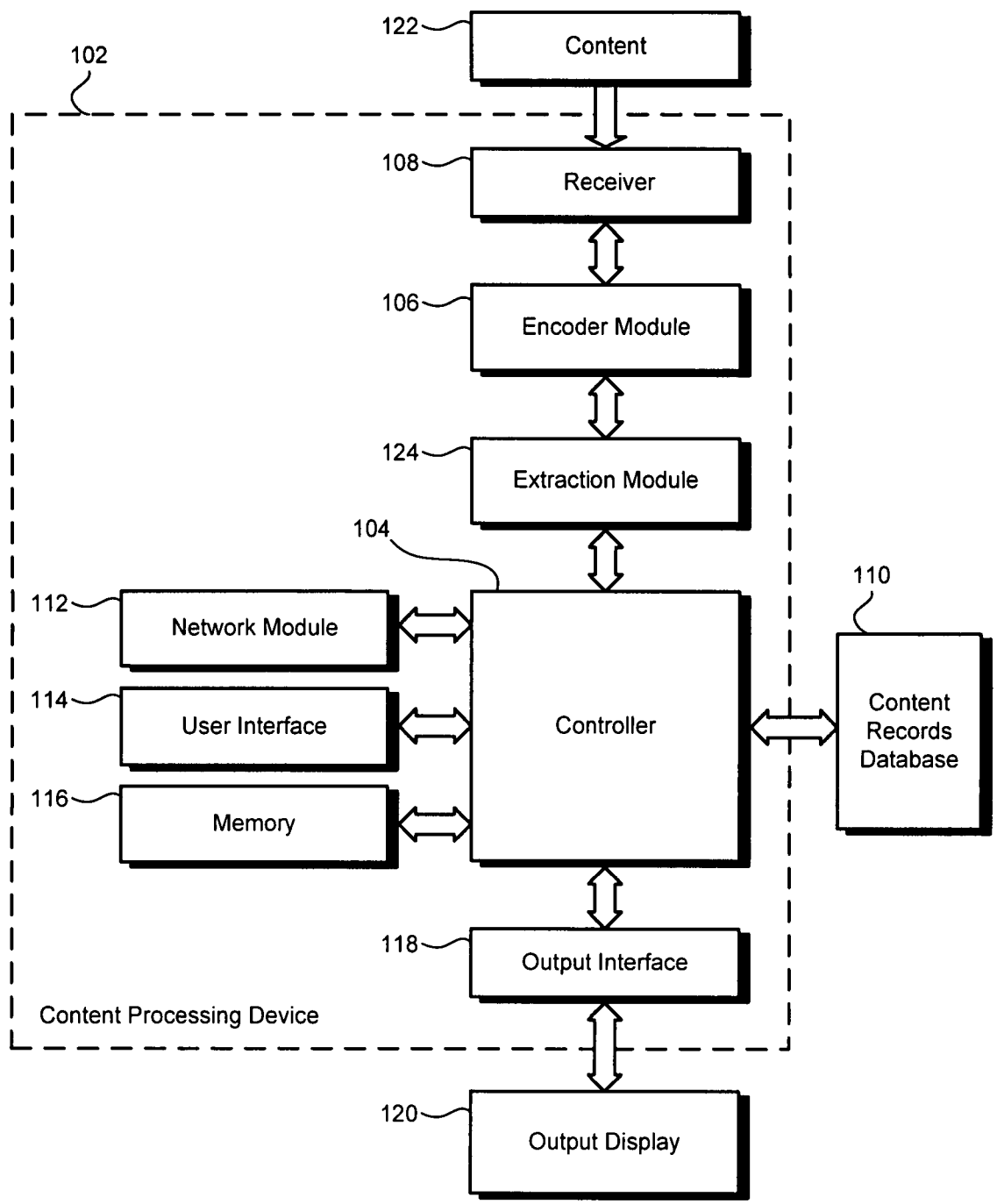
FIG. 1 illustrates a block diagram of a system for facilitating analysis of audience ratings data for content.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 illustrates a block diagram of a content processing device for facilitating the analysis of audience ratings data for content in accordance with one embodiment of the invention. As shown in FIG. 1, content processing device 102 includes controller 104, encoder module 106, receiver 108, extraction module 124, content records database 110, network module 112, user interface 114, memory 116, and output interface 118.

Content processing device 102 in FIG. 1 can be, for example, a personal computer or any other type of computer system. As shown in FIG. 1, controller 104 in content processing device 102 is coupled to extraction module 124, network module 112, content records database 110, memory 116, user interface 114, and output interface 118. As also shown in FIG. 1, content processing device 102 can be configured to receive content 122, which can be a television program for example, at receiver 108. Receiver 108 can be, for example, an interface configured to receive content from any one of a number of audio/video sources, such as a baseband router, a commercial cable broadcast signal, or a satellite broadcast signal.

Content records database 110 in FIG. 1 can be a memory device configured to store audience ratings data acquired for content 122. For example, the audience ratings data can include Nielsen Television Ratings that were measured when the content was broadcast on television. As such, the audience ratings data can include the ratings and share measured for each minute of the broadcast of content 122. For example, if content 122 is a thirty-minute television program, then content records database 110 might include 30 individual ratings, where each rating corresponds to a minute of content 122. Content records database 110 can be, for example, a Structured Query Language ("SQL") database.

As shown in FIG. 1, content received by receiver 108 can be provided to encoder module 106. Encoder module 106 can be implemented in hardware or software and can be used to encode content 122 into a video container format. For example, encoder module 106 may be implemented in software using Microsoft's "Windows Media Encoder" to encode content 122 into an Advanced Systems Format ("ASF") stream or file. Once encoded, content 122 can be provided to extraction module 124. Extraction module 124 can be implemented in hardware or software and can be configured to automatically detect video scene changes, i.e., keyframes, in content 122 and to extract the keyframes for the creation of a story board for content 122. Moreover, extraction module 124 can also be used to extract closed captioning text included in content 122. For example, extraction module 124 can be implemented using software such as "Pictron Video Gateway." The keyframes and closed captioning text can then be stored in content records database 110 by controller 104. In another embodiment, the keyframes and closed captioning text can be stored in memory 116. Memory 116, for example, can be a non-volatile storage device, such as a hard disk drive. Once the keyframes and closed captioning text have been extracted and processed, content processing device 102 can be configured to receive user entered annotations through user interface 114 discussed below. The annotations can then be stored, for example, in content records database 110.

Controller 104 shown in FIG. 1 can be implemented in hardware or software and can be configured to insert markers in content 122, i.e., in the ASF file of content 122, which can be used to index portions of content 122. For example, a first number of markers can be inserted to index each minute of content 122, a second number of markers can be inserted to index each keyframe in content 122, a third number of markers can be inserted to index each time code of closed captioning text of content 122, and a fourth number of markers can be inserted in content 122 to index the annotations entered by a user. Controller 104 can be further configured to associate each of the markers discussed above with the corresponding data stored in content records database 110. For example, controller 104 can associate the first number of markers inserted in content 122 discussed above with the corresponding audience ratings data stored in content records database 110. Thus, for example, the marker indexing the first minute of content 122 may be associated with the ratings measured for the first minute of content 122, the marker indexing the second minute of content 122 may be associated with the ratings measured for the second minute of content 122, and so on. Likewise, the marker indexing the first keyframe in content 122, for example, can be associated with the first keyframe extracted and stored in content records database 110. User-entered annotations are dynamically associated with the time line of the content and stored in content records database 110. The time line of the content is a time-span that is synchronized with the content. Each marker inserted in content 122, for example, can be associated to corresponding data stored in content records database 110 using a pointer generated by controller 104. After the markers have been inserted in content 122, controller 104 can be configured to store content 122 in memory 116.

User interface 114 in FIG. 1 can be used to display content 122 on output display 120. For example, user interface 114 can be a graphical user interface ("GUI"), such as Microsoft Windows, which includes the proper software to allow playback of content 122. For example, if content 122 is encoded into an ASF format, software such as Microsoft's Windows Media Player can be used to playback content 122. User interface 114 can then provide suitable output signals to output interface 118, which can be a video card or a display adapter for example, through controller 104. Output interface 118 can then provide the proper video signals to output display 120, which can be a television or computer monitor for example, to enable viewing of content 122.

When playback of content 122 is initiated by a user, controller 104 can be configured to display the audience ratings data stored in content records data base 110 on output display 120 during playback of content 122. For example, if content 122 is a 30 minute television program having minute-by-minute ratings, i.e., a separate rating for each minute of content 122, then controller 104 may be configured to display a graphical bar graph that includes 30 bars, where each bar represents a rating for a corresponding minute of content 122. As content 122 is played back, the first number of markers inserted in content 122 discussed above can be used by controller 104 to highlight the bar in the bar graph representing the ratings for the portion of content 122 that is currently being displayed. For example, when controller 104 detects the first marker in content 122 during the first minute of playback of content 122, controller 104 may change the color of the first bar in the graphical bar graph to a color different than the other bars in the bar graph. In one embodiment of the invention, the graphical bar graph can be configured to function as a navigation tool, such that each bar in the graphical bar graph can be selected by a user through user interface 114 to initiate playback of content 122 at a time period associated with the selected bar. For example, a user may select the eighth bar in the bar graph to initiate playback of content 122 from the eighth minute of content 122. Thus, for example, the invention allows a user to quickly navigate to a portion of content 122 where a substantial increase or decrease in ratings occurs.

In one embodiment of the invention, controller 104 can be configured to also display the keyframes extracted from content 122 during playback of content 122. For example, when a user initiates playback of content 122, controller 104 can retrieve all of the keyframes extracted from content 122 from content records database 110 and can display the keyframes in a storyboard format on output display 120. As content 122 is played back, the second number of markers inserted in content 122 discussed above can be used by controller 104 to highlight the keyframe in the storyboard corresponding to the scene in content 122 presently being displayed. For example, when controller 104 detects a marker in content 122 corresponding to the first keyframe in the storyboard, controller 104 may change the color of the first keyframe in the storyboard to a color different than the other keyframes in the storyboard. In another embodiment of the invention, the storyboard may scroll as each marker in content 122 is detected, thereby allowing a user to track the progress of content 122 in the storyboard during playback of content 122. In one embodiment of the invention, the storyboard can be configured to function as a navigation tool, such that each keyframe in the storyboard can be selected by a user through user interface 114 to initiate playback of content 122 at a time period associated with the selected keyframe.

In one embodiment of the invention, controller 104 can be configured to also display the closed captioning text extracted from content 122 during playback of content 122. For example, when a user initiates playback of content 122, controller 104 can retrieve all of the closed captioning text extracted from content 122 from content records database 110 and can display the closed captioning text during playback of content 122. As content 122 is played back, the third number of markers inserted in content 122 discussed above can be used by controller 104 to highlight the line of closed captioning text corresponding to the scene in content 122 presently being displayed. For example, when controller 104 detects a marker in content 122 corresponding to a line break in the closed captioning text, controller 104 may change the color of the closed captioning text following the line break to a color that is different than the other closed captioning text displayed. In another embodiment of the invention, the closed captioning text may scroll as each marker in content 122 is detected.

In one embodiment of the invention, each line of closed captioning text can be configured to function as a navigation tool, such that each line of closed captioning text can be selected by a user through user interface 114 to initiate playback of content 122 at a time period associated with the selected line of closed captioning text. In another embodiment, a user may perform a text search in the closed captioning text using user interface 114. If the text being sought is found in the closed captioning text, controller 104 can be configured to initiate playback of content 122 at a time period associated with the line of closed captioning text in which the text is found.

In one embodiment, controller 104 can be configured to also display the user entered annotations for content 122 during playback of content 122. For example, when a user initiates playback of content 122, controller 104 can retrieve all of the annotations from content records database 110 and can display the annotations during playback of content 122. As content 122 is played back, the fourth number of markers inserted in content 122 discussed above can be used by controller 104 to display the annotation corresponding to the scene in content 122 presently being displayed. In one embodiment of the invention, each annotation can be configured to function as a navigation tool, such that each annotation can be selected by a user through user interface 114 to initiate playback of content 122 at a time period associated with the annotation. In another embodiment, a user may perform a text search in the annotations using user interface 114. If the text being sought is found in the annotations, controller 104 can be configured to initiate playback of content 122 at a time period associated with the annotation in which the text is found.

Content processing device 102 can be configured to stream content 122, along with the corresponding data stored in content records database 110, e.g., the audience ratings data, the keyframes, and the closed captioning text, to a computer or other device coupled to a network using network module 114. Network module 114, for example, can be an Ethernet adapter. For example, a computer receiving content 122 can initiate playback of content 122 and can view the audience ratings data, the keyframes, and the closed captioning text during playback of the content and can use the audience ratings data, the keyframes, and the closed captioning text to navigate to various portions of content 122 as described above.

Figure 2A:
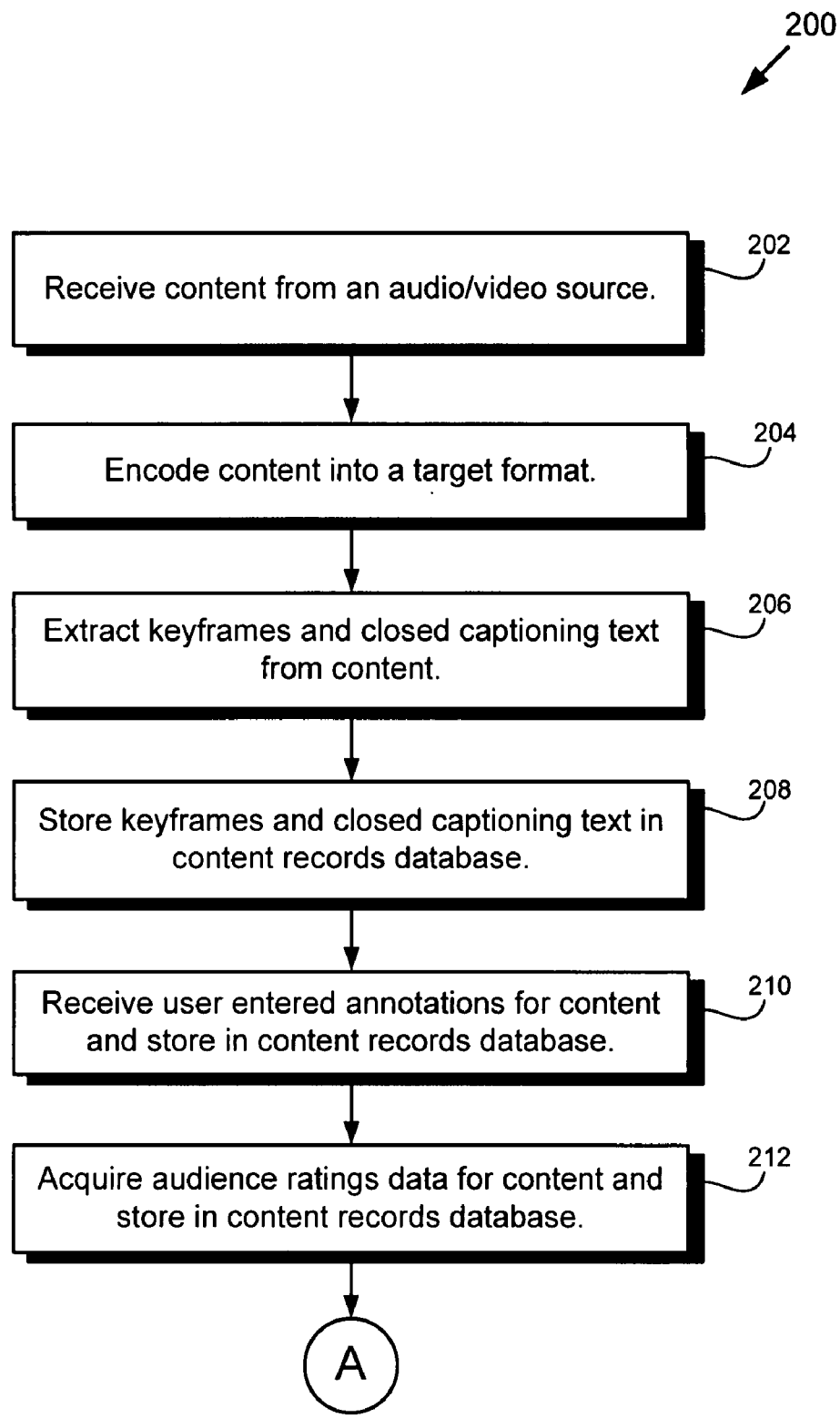
FIGS. 2A and 2B show a flowchart of a method for facilitating analysis of audience ratings data for content.
Figure 2B:
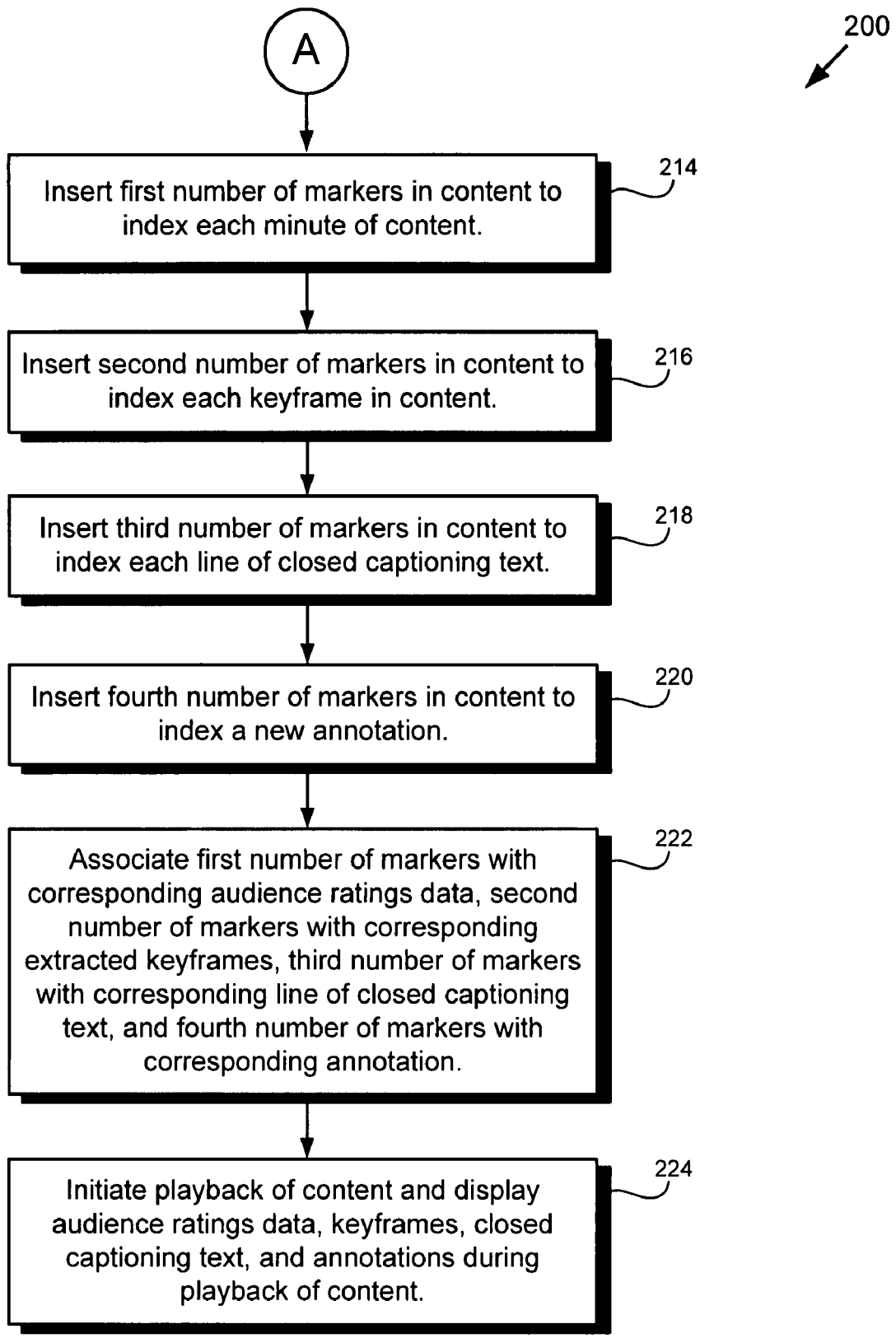

FIGS. 2A and 2B show a flowchart for performing method 200 for facilitating analysis of audience ratings data for content in accordance with one embodiment of the invention. As shown in FIG. 2A and with reference to FIG. 1, at step 202 of flowchart 200, content is received by content processing device 102 from an audio/video source. At step 204, the content is encoded into a target format. At step 206, keyframes and closed captioning text are extracted from the content. At step 208, the keyframes and closed captioning text are stored in content records database 110. At step 210, user-entered annotations for the content are received and stored in content records database 110. At step 212, audience ratings data measured for the content during the original broadcast of the content are acquired and stored in content records database 110.

Thereafter, as shown in FIG. 2B and with reference to FIG. 1, at step 214 of flowchart 200, a first number of markers are inserted in the content to index each minute of the content. At step 216, a second number of markers are inserted in the content to index each keyframe in the content. At step 218, a third number of markers are inserted in the content to index each line of the closed captioning text of the content. At step 220, a fourth number of markers are inserted in the content to index each new annotation. At step 222, the first number of markers are associated with the corresponding audience ratings data, the second number of markers are associated with the corresponding extracted keyframes, the third number of markers are associated with the corresponding line of closed captioning text, and the fourth number of markers are associated with each corresponding annotation. At step 224, playback of the content is initiated and the audience ratings data, the keyframes, the closed captioning text, and the annotations are displayed during playback of the content.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by a content processing device for facilitating analysis of audience ratings data for content, said method comprising:

receiving content from a source;

encoding said content into a target format to enable insertion of a first plurality of markers in said content, each of said first plurality of markers indexing a time period of said content;

accessing a content records database that includes said audience ratings data corresponding to a prior broadcast of said content;

associating said audience ratings data with said first plurality of markers;

displaying said audience ratings data as an interface for selecting from said first plurality of markers during playback of said content, wherein the interface displays said audience ratings and enables a user to navigate said content based on said audience ratings displayed on said interface;

receiving one of said first plurality of markers in response to a selection by a user from said interface displaying said audience ratings associated with said first plurality of markers; and changing said playback of said content to a time period indexed by said one of said first plurality of markers in response to said receiving.

2. The method of claim 1 wherein said audience ratings data is displayed in said interface using a bar graph that includes a plurality of graphical bars.

3. The method of claim 2, wherein each of said plurality of graphical bars represents a rating for a corresponding portion of said content designated by said first plurality of markers, and wherein said interface enables said user to navigate said content by selecting any of said plurality of graphical bars to initiate playback of said corresponding portion of said content.

4. The method of claim 1 further comprising inserting a second plurality of markers in said content, each of said second plurality of markers indexing a corresponding keyframe of said content.

5. The method of claim 4 further comprising selecting said keyframe to initiate playback of said content from said keyframe.

6. The method of claim 1 further comprising extracting closed captioning text from said content.

7. The method of claim 6 further comprising inserting a third plurality of markers in said content, each of said third plurality of markers indexing a line break in said closed captioning text to enable synchronized display of said closed captioning text with said content.

8. The method of claim 7 further comprising performing a user search for text in said closed captioning text, wherein playback of said content is initiated from a time period of said content associated with a line of closed captioning text in which said text is found.

9. The method of claim 1 further comprising streaming said content and said audience ratings data to a computer over a network.

10. The method of claim 1 wherein said audience ratings data comprises Nielsen ratings.

11. The method of claim 1, wherein each display of said audience ratings data represents a rating for a corresponding portion of said content designated by said first plurality of markers, and wherein said interface enables said user to navigate said content by selecting each display of said audience ratings data to initiate playback of said corresponding portion of said content.

12. A content processing device for facilitating analysis of audience ratings data for content, said content processing device comprising:
  a receiver for receiving content from a source;
  an encoder for encoding said content into a target format to enable insertion of a first plurality of markers in said content, each of said first plurality of markers indexing a time period of said content;
  a content records database for storing said audience rating data corresponding to a prior broadcast of said content;
  a controller for associating said audience ratings data with said first plurality of markers to enable display of said audience ratings data as an interface for selecting from said first plurality of markers during playback of said content, wherein the interface displays said audience ratings and enables a user to navigate said content based on said audience ratings displayed on said interface;
  wherein said controller is configured to receive one of said first plurality of markers in response to a selection by a user from said interface displaying said audience ratings associated with said first plurality of markers, and change said playback of said content to a time period indexed by said one of said first plurality of markers.

13. The content processing device of claim 12 wherein said audience ratings data is displayed in said interface using a bar graph that includes a plurality of graphical bars.

14. The content processing device of claim 13, wherein each of said plurality of graphical bars represents a rating for a corresponding portion of said content designated by said first plurality of markers, and wherein said interface enables said user to navigate said content by selecting any of said plurality of graphical bars to initiate playback of said corresponding portion of said content.

15. The content processing device of claim 12, wherein said controller is configured to insert a second plurality of marker in said content, each of said second plurality of markers indexing a keyframe of said content.

16. The content processing device of claim 15 further comprising a user interface, wherein said user interface is used to select said keyframe to initiate playback of said content from said keyframe.

17. The content processing device of claim 12 further comprising an extraction module, said extraction module being configured to extract closed captioning text from said content, wherein said controller is configured to insert a third plurality of markers in said content, each of said third plurality of markers indexing a line break in said closed captioning text.

18. The content processing device of claim 17 further comprising a user interface for performing a user search for text in said closed captioning text, wherein playback of said content is initiated from a time period of said content associated with a line of closed captioning text in which said text is found.

19. The content processing device of claim 12 further comprising a network module, said network module being configured to stream said content and said audience ratings data to a computer over a network.

20. The content processing device of claim 12 wherein said source is one of a baseband router, a cable broadcast signal, or a satellite broadcast signal.

21. The content processing device of claim 12 wherein said content is a television program.

22. The content processing device of claim 12, wherein each display of said audience ratings data represents a rating for a corresponding portion of said content designated by said first plurality of markers, and wherein said interface enables said user to navigate said content by selecting each display of said audience ratings data to initiate playback of said corresponding portion of said content.

23. A method for use by a content processing device for facilitating analysis of audience ratings data for content, said method comprising:
  receiving content from a source;
  encoding said content into a target format to enable insertion of a first plurality of markers in said content, each of said first plurality of markers indexing a time period of said content;
  accessing a content records database that includes said audience ratings data corresponding to a prior broadcast of said content;
  associating said audience ratings data with said first plurality of markers;
  displaying said audience ratings data as an interface for selecting from said first plurality of markers during playback of said content;
  receiving one of said first plurality of markers in response to a selection from said interface; and
  changing said playback of said content to a time period indexed by said one of said first plurality of markers in response to said receiving.

24. The method of claim 23 further comprising:
  associating a second number of markers with corresponding extracted keyframes in said content;
  associating a third number of markers with corresponding lines of closed captioning text in said content;
  associating a fourth number of markers with corresponding annotations in said content; and
  displaying said extracted keyframes, said lines of closed captioning text and said annotations as part of said interface.

* * * * *